(12) United States Patent
Ward et al.

(10) Patent No.: US 8,757,714 B2
(45) Date of Patent: Jun. 24, 2014

(54) MOTION SENSING SEAT LOCK

(75) Inventors: Barry Ward, Bel Aire, KS (US); Thang Chien Phi, Bel Aire, KS (US); Prasannakumar Bhonge, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 316 days.

(21) Appl. No.: 13/248,081

(22) Filed: Sep. 29, 2011

(65) Prior Publication Data

US 2013/0082502 A1 Apr. 4, 2013

(51) Int. Cl.
*B60N 2/433* (2006.01)
*B60N 2/42* (2006.01)
*B64D 25/04* (2006.01)

(52) U.S. Cl.
USPC .............................. 297/216.13; 297/216.14

(58) Field of Classification Search
USPC ........................... 297/216.13, 216.14, 378.11
See application file for complete search history.

(56) References Cited

U.S. PATENT DOCUMENTS

| | | | |
|---|---|---|---|
| 367,057 A | 7/1887 | Parham | |
| 372,430 A | 11/1887 | Parham | |
| 2,660,222 A * | 11/1953 | Woodsworth | 297/216.18 |
| 3,504,867 A * | 4/1970 | Stevenson | 242/381.1 |
| 4,225,178 A * | 9/1980 | Takada | 297/216.1 |
| 4,909,571 A * | 3/1990 | Vidwans et al. | 297/378.11 |
| 5,320,308 A * | 6/1994 | Bilezikjian et al. | 244/122 R |
| 5,346,281 A | 9/1994 | Hughes | |
| 5,366,268 A * | 11/1994 | Miller et al. | 297/216.1 |
| 5,507,553 A | 4/1996 | Nishizawa et al. | |
| 5,681,081 A * | 10/1997 | Lindner et al. | 297/216.13 |
| 6,561,584 B1 * | 5/2003 | Schwarz et al. | 297/367 R |
| 7,104,592 B2 * | 9/2006 | Song | 296/187.12 |
| 7,748,778 B1 * | 7/2010 | Udriste et al. | 297/216.1 |
| 8,550,564 B1 * | 10/2013 | Kismarton et al. | 297/452.55 |
| 2002/0089225 A1 | 7/2002 | Bruck et al. | |

* cited by examiner

*Primary Examiner* — David R Dunn
*Assistant Examiner* — Tania Abraham
(74) *Attorney, Agent, or Firm* — Lathrop & Gage LLP

(57) ABSTRACT

A lock for locking an object in a vehicle in place comprises a base comprising a side surface and a front surface. The side surface has at least one opening, and the front surface has a ballast retainer and a hub mounting portion. A hub is rotatably coupled to the hub mounting portion. A ballast, which is operatively coupled to the hub, is housed within the ballast retainer. At least one locking member is also operatively coupled to the hub. The ballast is configured to automatically reposition itself within the ballast retainer from an initial unlocked position to a final locked position in response to a change in velocity of the vehicle. This repositioning of the ballast actuates the hub, and causes the at least one locking member to extend past the at least one opening.

20 Claims, 5 Drawing Sheets

MOTION SENSING SEAT LOCK

CROSS-REFERENCE TO RELATED APPLICATIONS

None.

BACKGROUND OF THE INVENTION

1. Field of the Invention

The invention relates to the field of seat locks. More specifically, the invention relates to the field of motion sensing seat locks.

2. Description of the Related Art

It is known to lock a seat in position in response to an inertial change. For example, U.S. Pat. No. 5,507,553 to Nishizawa et al. discloses a seat locking mechanism having a V-shaped rotatable locking member. The locking member has two teethed portions, and is housed within a circular member having inner teeth configured to interlock with the two teethed portions of the V-shaped rotatable locking member. When a shock, such as that from a collision, is experienced by the seat, the locking member rotates within the circular member, and the teethed portions of the locking member engage with the inner teeth of the circular member and lock the seat in position.

U.S. Patent Application Publication No. U.S. 2002/0089225 to Bruck et al. discloses a locking mechanism having a latch gear having teeth towards the bottom. A pawl having teeth towards the top and a stepped surface at its right is connected to the latch gear via their respective teeth. A sudden shock causes the latch gear to move towards its left, which causes the pawl to move towards its right. The stepped surface of the pawl interlocks with a wedge, and locks the seat in position.

U.S. Pat. No. 5,346,281 to Hughes et al. provides an additional example, and discloses an inertial latching mechanism having a first hinged member, and a pawl mounted on a second hinged member. Both the first and second hinged members have teeth, and the first, second hinged members are distanced from one another during normal operation by a spring biasing mechanism. When a sudden shock is experienced, the pawl pivots and the teeth of the first and second hinged members interlock.

SUMMARY

The disclosed embodiments include systems and methods for locking an object. According to one embodiment, a lock for locking an object in a vehicle in place comprises a base comprising a side surface and a front surface. The side surface has at least one opening, and the front surface has a ballast retainer and a hub mounting portion. A hub is rotatably coupled to the hub mounting portion. A ballast, which is operatively coupled to the hub, is housed within the ballast retainer. At least one locking member is also operatively coupled to the hub. The ballast is configured to automatically reposition itself within the ballast retainer from an initial unlocked position to a final locked position in response to a change in velocity of the vehicle. This repositioning of the ballast actuates the hub, and causes the at least one locking member to extend past the at least one opening.

According to another embodiment, a lock for locking an aft-facing seat in an aircraft in a locked position includes a base comprising a side surface and a front surface. The side surface has a first opening and a second opening, and the front surface has a hub mounting portion, a first ballast retainer, and a second ballast retainer. A hub is rotatably coupled to the hub mounting portion, and a ballast is housed within the first ballast retainer. Four lock supports are operatively coupled to the hub. The lock further includes two locking members, and one locking member each is operatively coupled to two of the four lock supports. The ballast is configured to reposition itself within the first ballast retainer from an initial position to a final position in response to a change in velocity of the aircraft. Repositioning of the ballast from the initial position to the final position actuates the hub and causes the hub to rotate. Rotation of the hub causes the four lock supports to rotate along with the hub, which in-turn causes each of the two locking members to extend past a respective opening in the side surface of the base, and lock the aft-facing seat in the locked position.

According to yet another embodiment, a lock comprises a side surface and a front surface. The side surface has at least one opening, and the front surface has a hub mounting portion and a ballast retainer. A hub is rotatably coupled to the hub mounting portion. A ballast is operatively coupled to the hub and is housed within the ballast retainer. At least one locking member is further operatively coupled to the hub. The ballast repositions itself within the ballast retainer in response to an inertial change from an initial unlocked position to a final locked position. This repositioning of the ballast actuates the hub, which in-turn causes the at least one locking member to extend past the at least one opening.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
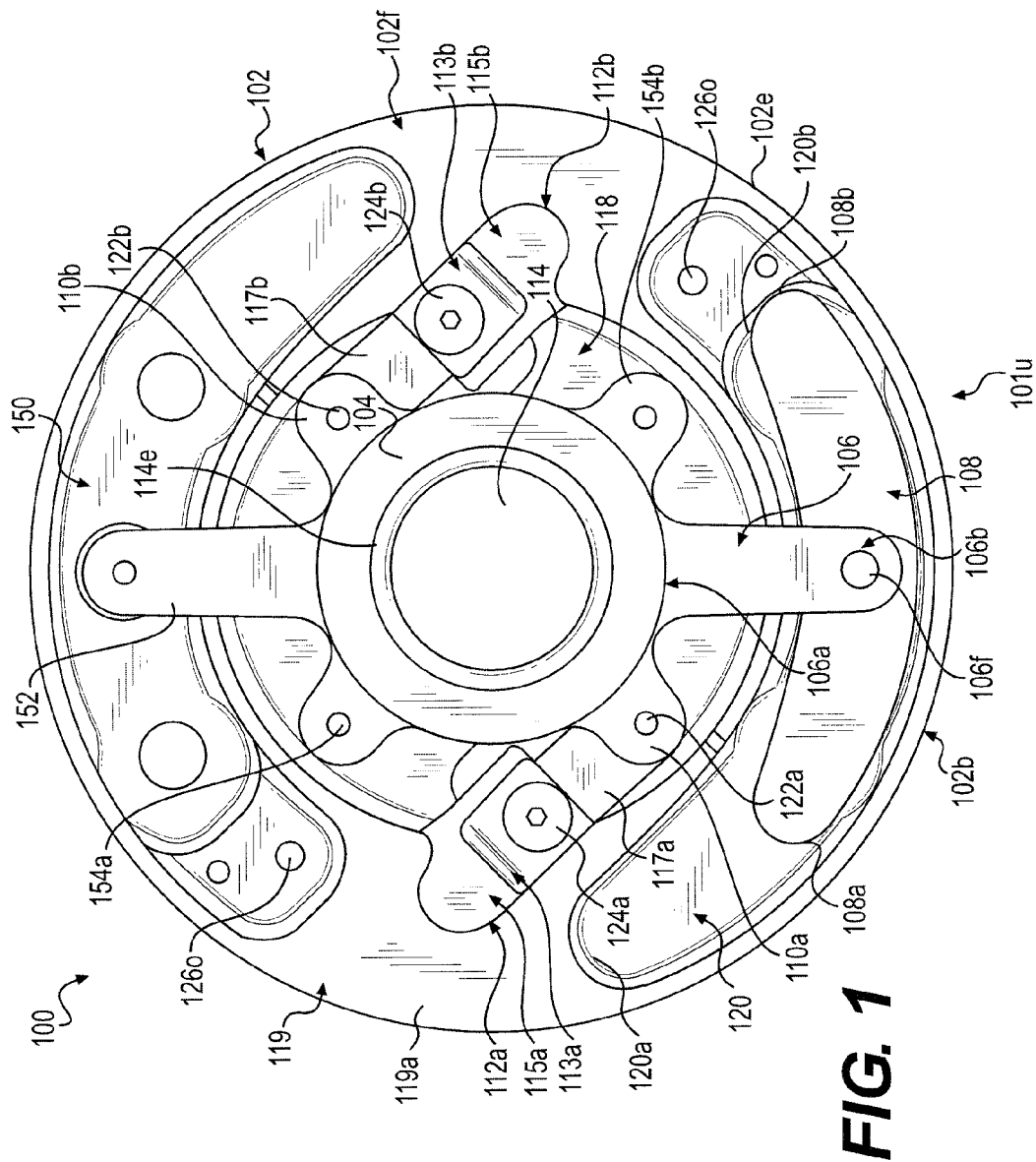
FIG. 1 is a top view of a motion sensing seat lock in an initial unlocked position in accordance with the teachings of the current invention.
Figure 2:
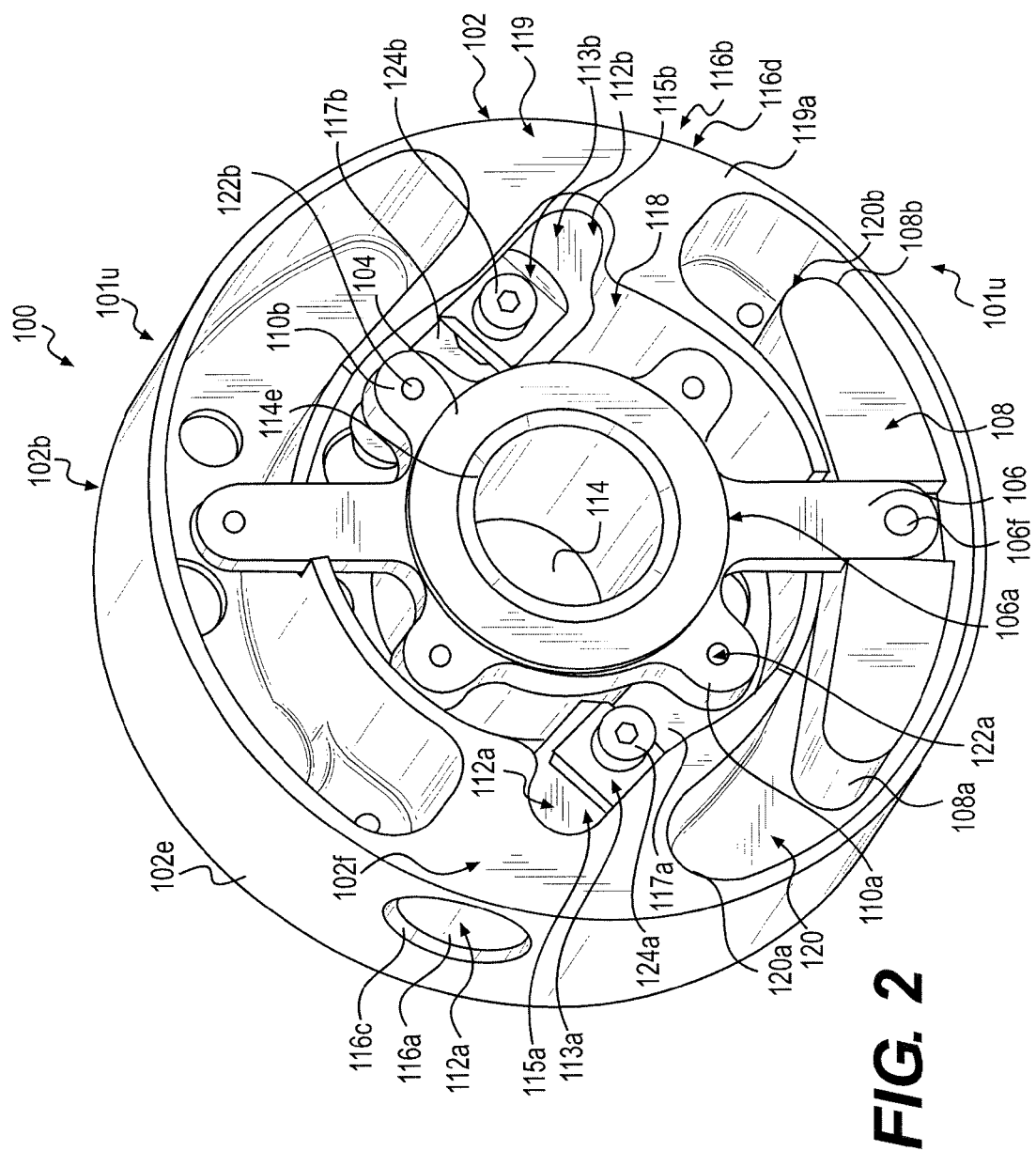
FIG. 2 is a perspective view of the motion sensing seat lock of FIG. 1 in the initial unlocked position.

Embodiments of the present invention provide systems and methods for automatically locking a seat in position upon experiencing a significant shock. Referring first to FIGS. 1 and 2, a motion sensing seat lock 100 in accordance with the teachings of the current invention includes a base 102, a hub 104, a hub actuation arm 106, a ballast 108, lock supports 110a, 110b, and locking members 112a, 112b.

The base 102 may be generally cylindrical, and have a front face 102f, a back face 102b (not clearly visible), and an edge 102e. A generally cylindrical cavity 114 defined by a rim 114e may extend through the front and back faces 102f, 102b of the base 102. The edge 102e of the base 102 may have a first opening 116a that is defined by a boundary 116c (FIG. 2). While not clearly visible from the figures, akin to the first opening 116a, the edge 102e has a second opening 116b that is defined by a boundary 116d.

The front face 102f may include an inner recessed hub mounting portion 118 that extends outwardly from the rim 114e, and an outer portion 119 that generally surrounds the hub mounting portion 118. The hub 104 and the lock supports 110a, 110b may be housed within the hub mounting portion 118.

The hub 104, which may encircle the rim 114e, is rotatable and may be operatively coupled to the lock supports 110a, 110b. The hub 104 may also be operatively coupled to the hub actuation arm 106 at a first side 106a of the arm 106. The hub 104, may, for example, be a bearing that is pressed into the first side 106a of the hub actuation arm 106 and lock supports 110a, 110b, or the hub 104 may be coupled to the first side 106a of the hub actuation arm 106 and lock supports 110a, 110b by screws, rivets, or other conventional means.

The outer portion 119 of the front face 102f of the base 102 may include a ballast retaining chamber 120 that houses the ballast 108; in other embodiments not shown in the figures, instead of the ballast retaining chamber 120, the front face 102f may have a ballast retainer 121 that may include limiting pins 121p, stops 121s, or a latch 121l, et cetera to limit the movement of the ballast 108. The hub actuation arm 106, which is coupled to the hub 104 at the first side 106a, may extend past the hub mounting portion 118 into the ballast retaining chamber 120, and be coupled to the ballast 108 at or close to a second side 106b of the hub actuation arm 106 via a fastener 106f, which may be a nut and bolt, a screw, a rivet, et cetera. The ballast 108 and the ballast retaining chamber 120 may be generally in the shape of a crescent as shown or of other regular or irregular shapes. The ballast 108 may have rounded edges 108a, 108b, and the ballast retaining chamber 120 may have rounded edges 120a, 120b that may be shaped to correspond to ballast edges 108a, 108b respectively. In an initial unlocked position 101u as shown in FIGS. 1, 2, the edge 108b of the ballast 108 is adjacent, and may be in contact with, the edge 120b of the ballast retaining chamber edge 120.

The locking member 112a may include a connecting portion 113a, and a locking portion 115a that extends outwardly from the connecting portion 113a; the locking member 112b may similarly include a connecting portion 113b, and a locking portion 115b that extends outwardly from the connecting portion 113b. The locking member 112a may be operatively coupled to the lock support 110a via a connecting rod 117a that extends at an angle from the lock support 110a to the connecting portion 113a of the locking member 112a. Similarly, the locking member 112b may be operatively coupled to the lock support 110b via a connecting rod 117b that extends at an angle from the lock support 110b to the connecting portion 113b of the locking member 112b. The connecting rods 117a, 117b may be secured to the lock supports 110a, 110b by fasteners 122a, 122b respectively, and to the connecting portions 113a, 113b of locking members 112a, 112b by fasteners 124a, 124b respectively. In this way, the hub 104, in addition to being operatively coupled to the ballast 108 (via the hub actuation arm 106), is also operatively coupled to the locking members 112a, 112b (via the lock supports 110a, 110b and connecting rods 117a, 117b respectively).

In the initial unlocked position 101u, the connecting rods 117a, 117b may reside within the hub mounting portion 118, along with at least part of the connecting portions 113a, 113b of the locking members 112a, 112b respectively and the fasteners 124a, 124b. The locking portion 115a of locking member 112a, in this initial unlocked position 101u, extends beyond the hub mounting portion 118 and underneath a top surface 119a of the outer portion 119 of the front face 102f, and rests adjacent the boundary 116c of the of the first opening 116a in the edge 102e (see FIG. 2). Although not clearly visible in the figures, the locking portion 115b of locking member 112b, in the initial unlocked position 101u, similarly extends beyond the hub mounting portion 118 and underneath the top surface 119a of the outer portion 119 of the front face 102f, and rests adjacent the boundary 116d of the of the second opening 116b in the edge 102e. As can be seen in FIG. 2, in the unlocked position 101u, the locking members 112a, 112b (and more specifically, the locking portions 115a, 115b) do not extend beyond the edge 102e or outside the first, second openings 116a, 116b respectively.

Figure 3:
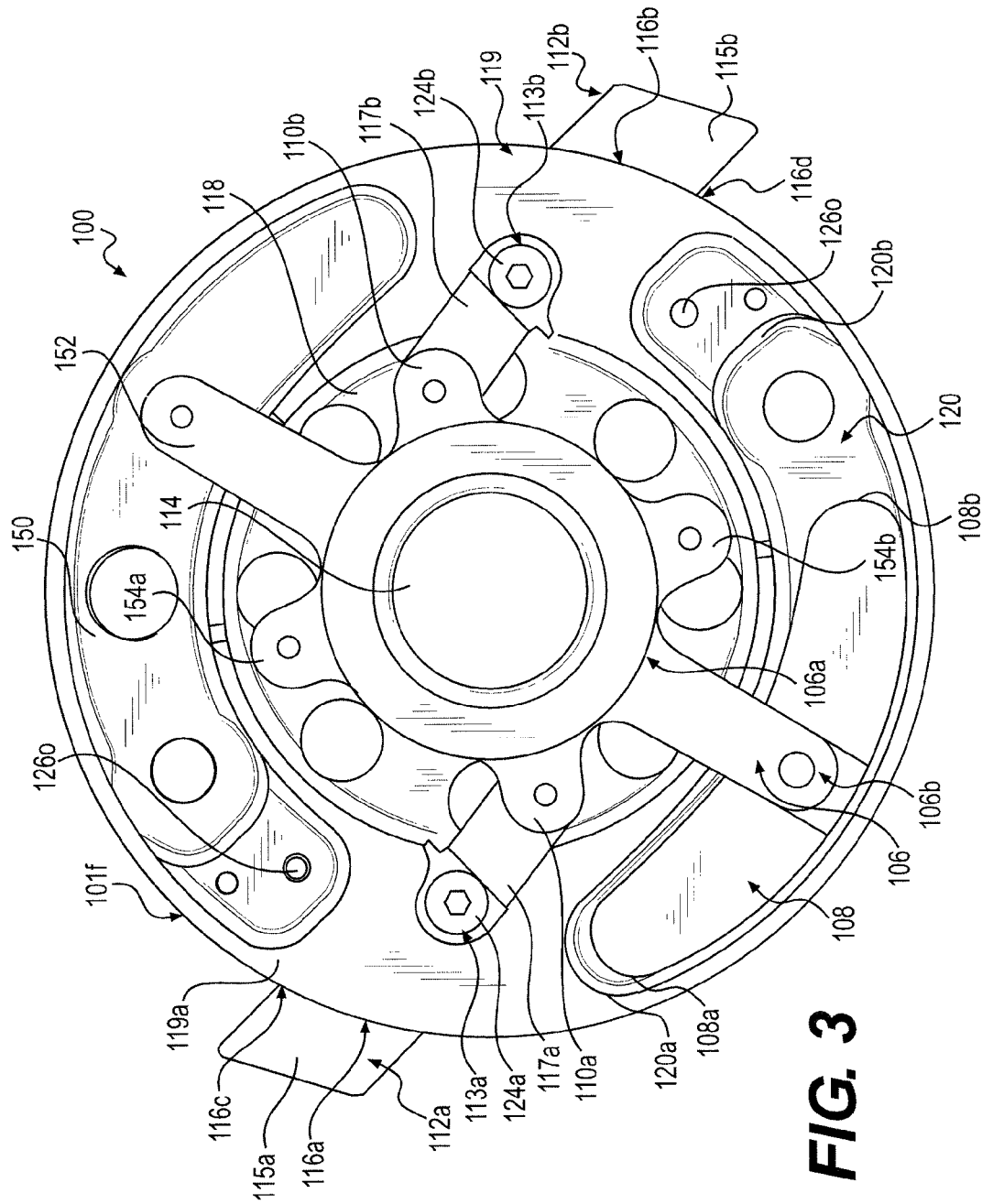
FIG. 3 is a top view of the motion sensing seat lock of FIG. 1 in a final locked position.

Attention is now directed to FIG. 3, which shows the motion sensing seat lock 100 in a final locked position 101f. As can be seen from comparing FIG. 1 and FIG. 3, in the final locked position 101f, the edge 108a of the ballast 108 is adjacent and/or in contact with the edge 120a of the ballast retaining chamber 120 (as opposed to the edge 108b of the ballast 108 being adjacent and/or in contact with edge 120b of the ballast retaining chamber 120). The fasteners 124a, 124b, that secure the connecting portions 113a, 113b of locking members 112a, 112b to the connecting rods 117a, 117b respectively, in the final locked position 101f, extend past the hub mounting portion 118 and rest atop the top surface 119a of the outer portion 119. Additionally, the locking portions 115a, 115b of the locking members 112a, 112b, now respectively extend beyond the boundaries 116c, 116d of the first and second openings 116a, 116b in the edge 102e.

The motion sensing seat lock 100 can be brought from its initial unlocked position 101u to the final locked position 101f by simply repositioning the ballast 108 within the ballast retaining chamber 120. More specifically, the edge 108b of the ballast 108 is shifted away from the edge 120b of the ballast retaining chamber 120 in a clockwise direction until the edge 108a of the ballast 108 comes into contact with and/or becomes adjacent the edge 120a of the ballast retaining chamber 120. As the ballast 108 moves in the clockwise direction in this fashion, the hub actuation arm 106, which is secured at its second side 106b to the ballast 108, also moves in the clockwise direction. The first side 106a of the hub actuation arm 106 is in-turn coupled to the rotatable hub 104, and thus, as the ballast 108 moves in the clockwise direction, the hub actuation arm 106 actuates the hub 104 and causes the hub 104 to rotate in the clockwise direction. The hub 104 is in-turn coupled to the lock supports 110a, 110b, and hence, as the hub 104 rotates in the clockwise direction, it causes the lock supports 110a, 110b to also rotate in the clockwise direction within the hub mounting portion 118.

The lock supports 110a, 110b are secured to the connecting rods 117a, 117b respectively. Consequently, as the lock supports 110a, 110b rotate in the clockwise direction along with the hub 104, the connecting rods 117a, 117b, which extend from the lock supports 110a, 110b respectively at an angle, are pushed, generally laterally, outwardly from the hub mounting portion 118 towards the outer portion 119 of the front face 102f. The connecting rods 117a, 117b are in-turn secured to the connecting portions 113a, 113b of the locking members 112a, 112b respectively, and as such, the generally lateral movement of the connecting rods 117a, 117b pushes the locking members 112a, 112b away from the hub mounting portion 118, and causes the locking portions 115a, 115b of the locking members 112a, 112b to extend beyond the openings 116a, 116b in the edge 102e of the base 102. The hub 104 may be configured (e.g., via stops) such that it can be only be made to rotate in the anti-clockwise direction with the intervention of an authorized user, and as such, once the locking members 112a, 112b (i.e., locking portions 115a, 115b) extend outwardly from the openings 116a, 116b, an object being secured via the motion sensing seat lock 100 may be locked into place.

Figure 4:
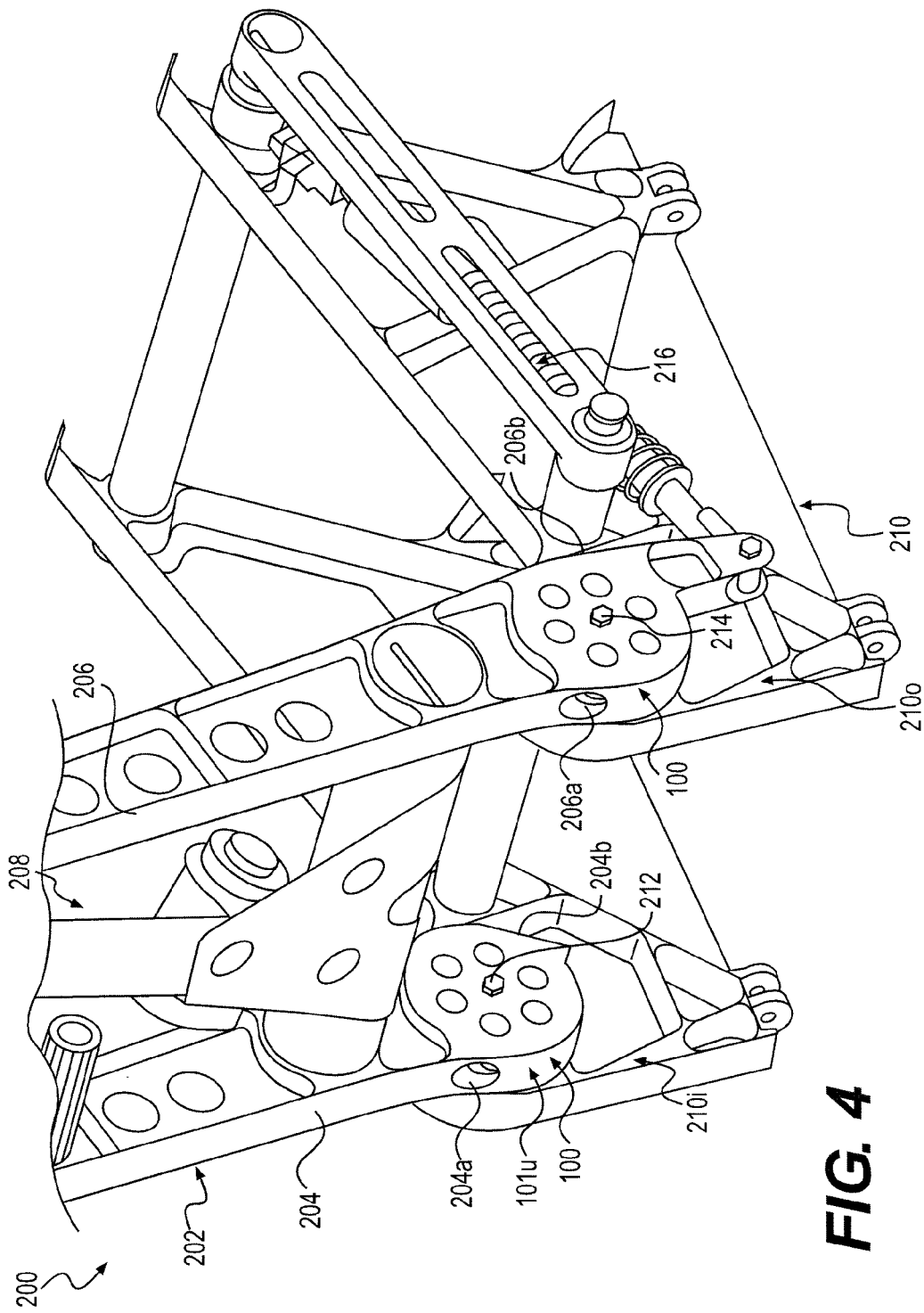
FIG. 4 is a perspective view of a seat assembly incorporating the motion sensing seat lock of FIG. 1, with the lock being in the initial unlocked position.
Figure 5:
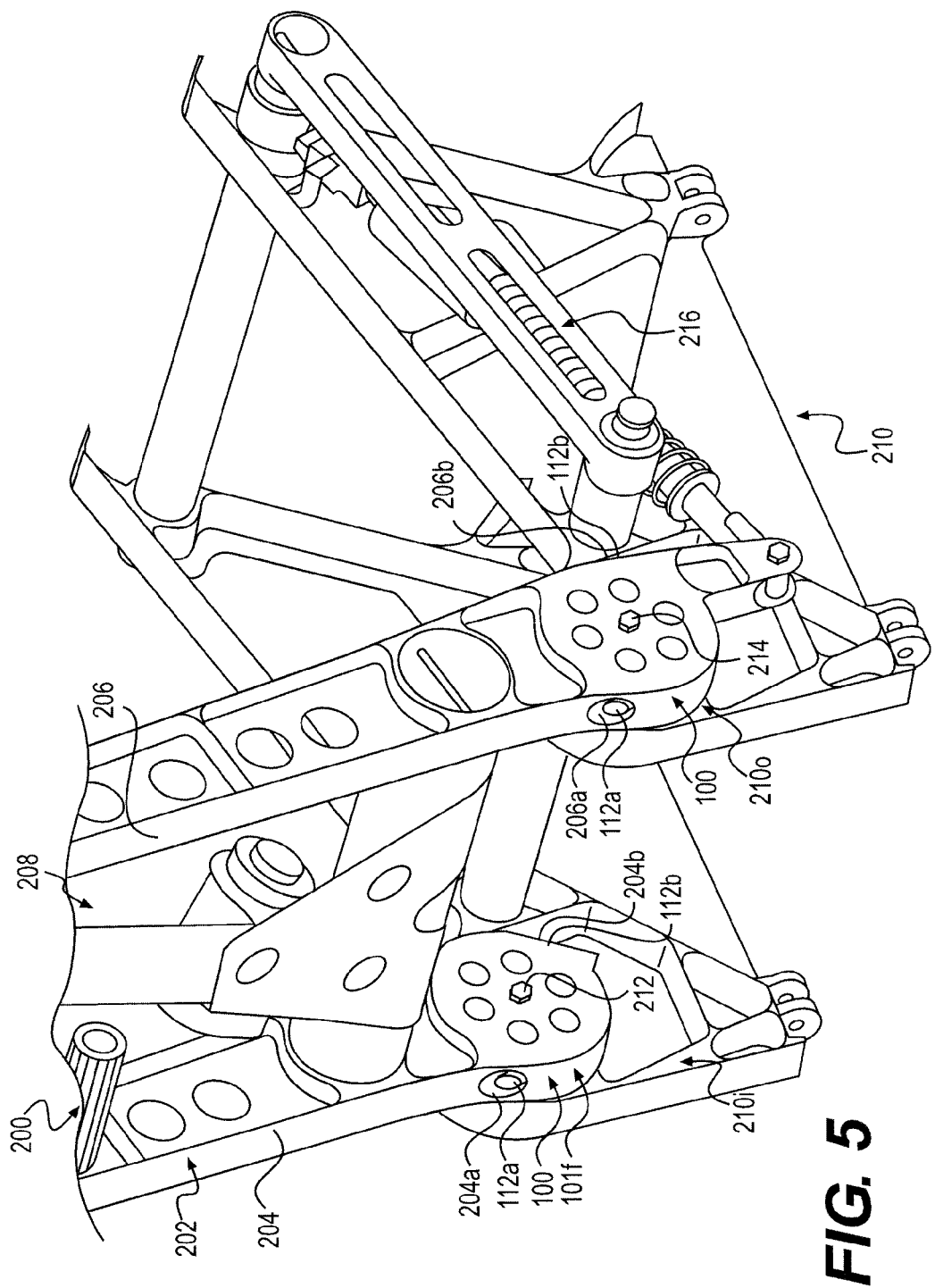
FIG. 5 is a perspective view of the seat assembly of FIG. 4 with the motion sensing seat lock in the final locked position.

For example, as shown in FIGS. 4 and 5, the motion sensing seat lock 100 may be used to automatically lock a seat 200 in an aircraft (or car, et cetera) after the aircraft experiences a significant change in velocity. The seat 200 may be, for instance, an aft-facing seat, which is arguably safer than a front-facing seat, because, in the event of a sudden deceleration such as that associated with an emergency landing, the occupant is thrown into the aft-facing seat as opposed to out of it. More specifically, with respect to a front-facing seat, while the aircraft suddenly decelerates in preparation for an emergency landing, the occupant tends to remain in motion, and is thrown out of the seat. The weight of the occupant, thus, has to be borne by the straps of the seat belt alone, which may give way in such an event, and which may injure the occupant. Contrarily, in the aft-facing seat 200, as the aircraft suddenly decelerates in preparation for an emergency landing, the occupant is pushed into the seat, and the weight of the occupant is distributed over the entire seatback. This provides improved support for the occupant as compared to the seat belt straps. The motion sensing seat lock 100 may be configured with such an aft-facing seat 200 to ensure that the seatback remains in the upright position and does not give way under the added stress it experiences in the event of such a sudden change in velocity.

The aft-facing seat 200 may include a seatback assembly 202 having arms 204, 206, a seatback 208 (not shown for clarity), a seat base assembly 210, seat adjusting pivots 212, 214, and a hydrolock 216. The arms 204, 206 of the seatback assembly 202 may each have a first opening 204a, 206a respectively; while not clearly visible in the figures, each arm 204, 206 may also have a second opening 204b, 206b respectively. One motion sensing seat lock 100 is secured to the seat base assembly 210 at each of the seat reclining pivots 212, 214 such that the openings 204a, 206a in the arms 204, 206 of the seatback assembly 202 are respectively adjacent the first opening 116a in the edge 102e of the motion sensing seat lock 100 (see FIGS. 1, 2, and 4); similarly, while not clearly visible in the figures, the second openings 204b, 206b in the arms 204, 206 are respectively adjacent the second openings 116b in the edge 102e of the lock 100. The motion sensing seat locks 100 may be secured to the seat base assembly 210 by fasteners that are passed through openings 126o (see FIG. 1) in the outer portion 119 of the front face 102f and the seat base assembly 210, or by other conventional means. The seat reclining pivots 212, 214 may extend through the cavity 114 that is generally at the center of the front face 102f (see FIG. 1), and through the seat back arms 204, 206. During the course of a routine flight, the occupant may, for example, attempt to recline the seatback assembly 202 by leaning against the seatback 208 and actuating the hydrolock 216 via a lever and cable, causing the seatback assembly 202 to pivot around the seat adjusting pivots 212, 214. When the occupant deactivates the hydrolock 216, the seatback 208, as is known, locks in the reclined position. The motion sensing seat locks 100 remain stationery during such normal operation, and do not come into play. When the seatback 208 is in the generally upright position and the aircraft experiences a significant change in velocity, however, the motion sensing locks 100 activate and lock the seatback assembly 202 in the upright position.

More specifically, the ballast 108 (and more particularly, its weight) is configured such that under normal conditions, the ballast edge 108b remains adjacent and/or in contact with the edge 120b of the ballast retaining chamber 120 in the initial unlocked position 101u (see FIGS. 1, 2). Alternatively, or in addition, tension may be introduced in the hub 104 (e.g., via a spring) such that under normal conditions, including conditions involving routine turbulence, the ballast edge 108b remains adjacent and/or in contact with edge 120b of the ballast retaining chamber 120. When the aircraft suddenly experiences a sufficiently significant change in velocity, such as the deceleration associated with an emergency landing, however, the ballast 108, which has a tendency to remain in motion like other moving objects, may overcome the forces attempting to keep the ballast 108 at rest (e.g., its weight and/or a spring), and rotate in the clockwise direction. As the ballast 108 of the lock 100 associated with each of the seatback arms 204, 206 rotates clockwise such that its edge 108a becomes adjacent and/or in contact with the edge 120a of the ballast retaining chamber 120, the hub 104 is actuated as discussed above, and in the final locked position 101f, the locking members 112a, 112b (i.e., locking portions 115a, 115b) laterally extend out of the openings 116a, 116b respectively in the edge 102e.

Since the locks 100 are secured such that the first openings 116a in the edge 102e of the respective locks 100 are adjacent the first openings 204a, 206a in the arms 204, 206 of the seatback 202, as shown in FIG. 5, in the final locked position, the locking members 112a (i.e., locking portions 115a) extend not only beyond the first opening 116a in the edge 102e, but also past the first openings 204a, 206a in arms 204, 206 of the seatback assembly 202. The seatback assembly 202 is thus permanently held in place by virtue of its arms 204, 206 being locked at their respective first openings 204a, 206a by the locking member 112a. Similarly, while not clearly visible in the figures, the locking members 112b (i.e., locking portions 115b) of the locks 100 associated with each arm 204, 206 extend out the second openings 116b in the edge 102e and the second openings 204b, 206b in the seat arms 204, 206, and additionally ensure that the seatback 202 remains locked in position. The motion sensing seat lock 100, thus, enhances the safety of an occupant of the aft-facing seat 200 without requiring any effort from the occupant, and further reduces costs associated with maintenance by reducing cable linkages that are required to operate traditional member locks in manual locking mechanisms. A person skilled in the art will appreciate that the seat 200 may also be locked by the motion sensing seat lock 100 in other ways; for example, the extension of the locking members 112a, 112b may be used to actuate a gear, pulley, or a separate non-inertial locking mechanism that locks the seat 200 in place.

All aft-facing seats 200 in the aircraft may not be configured the same; for example, in FIGS. 4 and 5, the hydrolock 216, which, when looking from behind the seat back 208 is secured at the right side of the seat 200, may, in other aft-facing seats 200, be secured at the left of the seat 200. Similarly, while the left seat back arm 204 in FIGS. 4 and 5 is secured to an inner surface 210i of the seat base assembly 210 and the right seat back arm 206 is secured to an outer surface 210o of the seat base assembly 210, in other aft-facing seats 200, the left seat back arm 204 may be secured to the outer surface 210o of the seat base assembly 210, and the right seat back arm may be secured to the inner surface 210i of the seat base assembly 210. To ensure that the motion sensing seat lock 100 may be used to lock differently configured aft-facing seats 200, the front face 102f of the base 102 may include an alternate ballast retaining chamber 150, an alternate hub actuation arm 152, and alternate lock supports 154a, 154b (see FIG. 1). Thus, as persons skilled in the art will appreciate, the ballast 108 may be secured to the alternate hub actuation arm 152 instead of the hub actuation arm 106, and may be housed within the alternate ballast retaining chamber 150 instead of the ballast retaining chamber 120. Similarly, the locking members 112a, 112b may be coupled via connecting rods 117a, 117b to the alternate lock supports 154a, 154b respectively, instead of the lock supports 110a, 110b. The edge 102e may have two openings (not shown) in addition to openings 116a, 116b to allow for the extension of the locking members 112a, 112b when they are coupled to the alternate lock supports 154a, 154b via connecting rods 117a, 117b respectively. The motion sensing seat lock 100, hence, may provide the flexibility to automatically lock differently configured aft-facing seats 200 in response to a shock.

Many different arrangements of the various components depicted, as well as components not shown, are possible without departing from the spirit and scope of the present invention. Embodiments of the present invention have been described with the intent to be illustrative rather than restrictive. For example, while the invention has been disclosed primarily with reference to aft-facing seats of aircrafts, a person skilled in the art will appreciate that with slight modifications, the locks 100 may be used to lock other types of seats. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A lock for locking an object in a vehicle in place, the lock comprising:
   a base comprising a side surface and a front surface, the side surface having at least one opening, the front surface having a hub mounting portion and a ballast retainer;
   a hub rotatably coupled to the hub mounting portion;
   a ballast housed within the ballast retainer, the ballast being operatively coupled to the hub;
   at least one locking member operatively coupled to the hub;
   wherein repositioning of the ballast from an initial unlocked position to a final locked position within the ballast retainer actuates the hub and causes the at least one locking member to extend past the at least one opening; and
   wherein the ballast is configured to automatically reposition itself from the initial unlocked position to the final locked position in response to a change in velocity of the vehicle;
   and wherein:
      the vehicle is an aircraft;
      the object is an aft-facing seat in the aircraft;
      the ballast retainer comprises a ballast retaining chamber;
      the aft-facing seat is locked by the extension of the at least one locking member past the at least one opening in the side surface and at least one hole in an arm of a seat back assembly of the aft-facing seat;
      the at least one opening in the side surface consists of a first opening and a second opening; and
      the at least one locking member consists of a first locking member and a second locking member.

2. The lock of claim 1, further comprising:
   a hub actuation arm that extends from the ballast to the hub;
   wherein the repositioning of the ballast from the initial position to the final position causes the hub actuation arm to move from a first position to a second position; and
   wherein the movement of the hub actuation arm from the first position to the second position actuates the hub and causes the hub to rotate.

3. The lock of claim 2, further comprising:
   a first lock support and a second lock support, the first and second lock supports being operatively coupled to the hub; and
   wherein the first and second lock supports rotate along with the hub when the hub actuation arm moves from the first position to the second position.

4. The lock of claim 3, further comprising:
   a first connecting rod extending at an angle between the first lock support and the first locking member; and
   a second connecting rod extending at an angle between the second lock support and the second locking member.

5. The lock of claim 4, further comprising:
   an alternate ballast retainer;
   an alternate hub actuation arm; and
   a first alternate lock support and a second alternate lock support;
   wherein the alternate hub actuation arm, the first alternate lock support, and the second alternate lock support are operatively coupled to the hub.

6. The lock of claim 5, wherein:
   the alternate ballast retainer comprises an alternate ballast retaining chamber;
   the ballast retaining chamber and the alternate ballast retaining chamber are generally in the shape of a crescent.

7. A lock for locking an aft-facing seat in an aircraft in a locked position, the lock comprising:
   a base comprising:
      a side surface having a first opening and a second opening;
      a front surface having a hub mounting portion, a first ballast retainer, and a second ballast retainer;
   a hub rotatably coupled to the hub mounting portion;
   a ballast housed within the first ballast retainer;
   four lock supports operatively coupled to the hub;
   two locking members, one locking member each being operatively coupled to two of the four lock supports;
   wherein the ballast is configured to reposition itself within the first ballast retainer from an initial position to a final position in response to a change in velocity of the aircraft;
   wherein the repositioning of the ballast from the initial position to the final position actuates the hub and causes the hub to rotate;
   wherein rotation of the hub causes the four lock supports to rotate along with the hub; and
   wherein rotation of the lock supports causes each of the two locking members to extend past a respective opening in the side surface and lock the aft-facing seat in the locked position.

8. The lock of claim 7, wherein:
   the base is generally cylindrical; and
   the first and the second ballast retainers respectively comprise first and second ballast retaining chambers.

9. The lock of claim 8, wherein the ballast is generally in the shape of a crescent.

10. The lock of claim 9, wherein:
the aft-facing seat includes a seatback assembly and a seat base assembly; and
each locking member extends through a hole in the seatback assembly to lock the seat in the locked position.

11. The lock of claim 9, wherein:
the aft-facing seat includes a seatback assembly and a seat base assembly; and
each locking member extends through a hole in the seat base assembly to lock the seat in the locked position.

12. The lock of claim 11, wherein each of the two locking members is coupled to a respective lock support by a connecting rod.

13. The lock of claim 12, wherein the ballast is configured to reposition itself from the initial position to the final position only in response to a significant deceleration.

14. A lock for locking an object in a vehicle in place, comprising:
a generally cylindrical base comprising a side surface and a front surface, the side surface having a first opening and a second opening opposing said first opening, the front surface having a hub mounting portion and a ballast retaining chamber;
a hub rotatably coupled to the hub mounting portion;
a ballast housed within the ballast retaining chamber, the ballast being operatively coupled to the hub; and
a first locking member and a second locking member each operatively coupled to the hub;
wherein repositioning of the ballast from an initial unlocked position to a final locked position actuates the hub and causes the first locking member to extend past the first opening and the second locking member to extend past the second opening;
wherein the ballast is configured to automatically reposition itself from the initial unlocked position to the final locked position in response to a change in velocity of the vehicle;
wherein the front surface further comprises an alternate ballast retaining chamber opposite the ballast retaining chamber.

15. The lock of claim 14, wherein the ballast is generally in the shape of a crescent.

16. The lock of claim 14 wherein the object is locked in place by the extension of the first and the second locking members respectively past the first and second openings and into a first hole and a second hole of an assembly of the object.

17. The lock of claim 16 wherein the first locking member is operably coupled to the hub via at least a connecting rod and a lock support.

18. The lock of claim 17 wherein the connecting rod extends from the lock support at an angle.

19. The lock of claim 14 wherein the vehicle is an aircraft.

20. The lock of claim 19 wherein the object is a seat in the aircraft.

* * * * *